United States Patent
Wagener et al.

(10) Patent No.: US 9,632,391 B2
(45) Date of Patent: Apr. 25, 2017

(54) WAVELENGTH SELECTIVE SWITCH EMPLOYING A LCOS DEVICE AND HAVING REDUCED CROSSTALK

(71) Applicant: Nistica, Inc., Bridgewater, NJ (US)

(72) Inventors: Jefferson L. Wagener, Morristown, NJ (US); Takaaki Ishikawa, Tokyo (JP)

(73) Assignee: Nistica, Inc., Bridgewater, NJ (US)

( * ) Notice: Subject to any disclaimer, the term of this patent is extended or adjusted under 35 U.S.C. 154(b) by 161 days.

(21) Appl. No.: 14/220,639

(22) Filed: Mar. 20, 2014

(65) Prior Publication Data

US 2014/0285867 A1 Sep. 25, 2014

Related U.S. Application Data

(60) Provisional application No. 61/803,528, filed on Mar. 20, 2013.

(51) Int. Cl.

| | |
|---|---|
| *G02F 1/01* | (2006.01) |
| *G02F 1/31* | (2006.01) |
| *G02B 6/35* | (2006.01) |
| *H04J 14/02* | (2006.01) |

(52) U.S. Cl.
CPC . *G02F 1/31* (2013.01); *G02B 6/35* (2013.01); *H04J 14/02* (2013.01)

(58) Field of Classification Search
CPC ............... H04J 14/02; G02B 6/35; G02F 1/31
USPC .......................... 359/279, 245, 240, 238, 237
See application file for complete search history.

(56) References Cited

U.S. PATENT DOCUMENTS

| | | | |
|---|---|---|---|
| 6,430,328 | B1 | 8/2002 | Culver et al. |
| 6,956,687 | B2 | 10/2005 | Moon et al. |
| 7,092,599 | B2 | 8/2006 | Frisken |
| 7,123,833 | B2 | 10/2006 | Szczepanek et al. |
| 7,126,740 | B2 | 10/2006 | Szczepanek et al. |
| 7,397,980 | B2 | 7/2008 | Frisken |
| 2011/0033151 | A1 | 2/2011 | Cohen et al. |
| 2012/0002917 | A1 | 1/2012 | Colbourne |
| 2014/0023316 | A1* | 1/2014 | McLaughlin ................ 385/17 |

FOREIGN PATENT DOCUMENTS

| | | |
|---|---|---|
| JP | 2008-139477 | 6/2008 |
| JP | 2010-026427 | 2/2010 |
| WO | 2012-123715 | 9/2012 |

* cited by examiner

*Primary Examiner* — Tuyen Tra
(74) *Attorney, Agent, or Firm* — Stuart H. Mayer; Mayer & Williams PC

(57) ABSTRACT

An optical device in which crosstalk due to scattering is reduced includes an optical port array having at least one optical input for receiving an optical beam and at least one optical output. The input and outputs extend along a common axis. A dispersion element receives the optical beam from the optical input and spatially separates the optical beam into a plurality of wavelength components. A focusing element focuses the plurality of wavelength components and a programmable optical phase modulator receives the focused plurality of wavelength components. The modulator is configured to steer the wavelength components to a selected one of the optical outputs. The programmable optical phase modulator is oriented with respect to the optical port array so that an axis along which the optical beam is steered is non-coincident with the common axis along which the input and outputs extend.

16 Claims, 4 Drawing Sheets

WAVELENGTH SELECTIVE SWITCH EMPLOYING A LCOS DEVICE AND HAVING REDUCED CROSSTALK

BACKGROUND

Optical networks use Wavelength Selective Switches (WSS) to dynamically route optical wavelength signals from a source to a destination. WSS devices often rely on wavelength manipulation elements such as liquid crystal on silicon (LCoS) devices or micro-electromechanical (MEMS) mirror arrays to perform the routing.

LCoS devices include a liquid crystal material sandwiched between a transparent glass layer having a transparent electrode, and a silicon substrate divided into a two-dimensional array of individually addressable pixels. Each pixel is individually drivable by a voltage signal to provide a local phase change to an optical signal, thereby providing a two-dimensional array of phase manipulating regions. Manipulation of individual spectral components is possible once an optical signal has been spatially separated by a diffractive element such as a diffraction grating. The spatial separation of spectral components is directed onto predetermined regions of the LCoS device, which can be independently manipulated by driving the corresponding pixels in a predetermined manner.

Although wavelength selective switches that employ LCoS devices have some very attractive performance characteristics, they also suffer from undesired optical crosstalk, which refers to un-desired power coupled from an input port to an output port at a particular wavelength.

SUMMARY

In accordance to one aspect of the invention, an optical device is provided in which crosstalk due to scattering is reduced. The optical device includes an optical port array having at least one optical input for receiving an optical beam and at least one optical output. The input and outputs extend along a common axis. A dispersion element receives the optical beam from the optical input and spatially separates the optical beam into a plurality of wavelength components. A focusing element focuses the plurality of wavelength components and a programmable optical phase modulator receives the focused plurality of wavelength components. The modulator is configured to steer the wavelength components to a selected one of the optical outputs. The programmable optical phase modulator is oriented with respect to the optical port array so that an axis along which the optical beam is steered is non-coincident with the common axis along which the input and outputs extend.

DETAILED DESCRIPTION

Figure 1A:
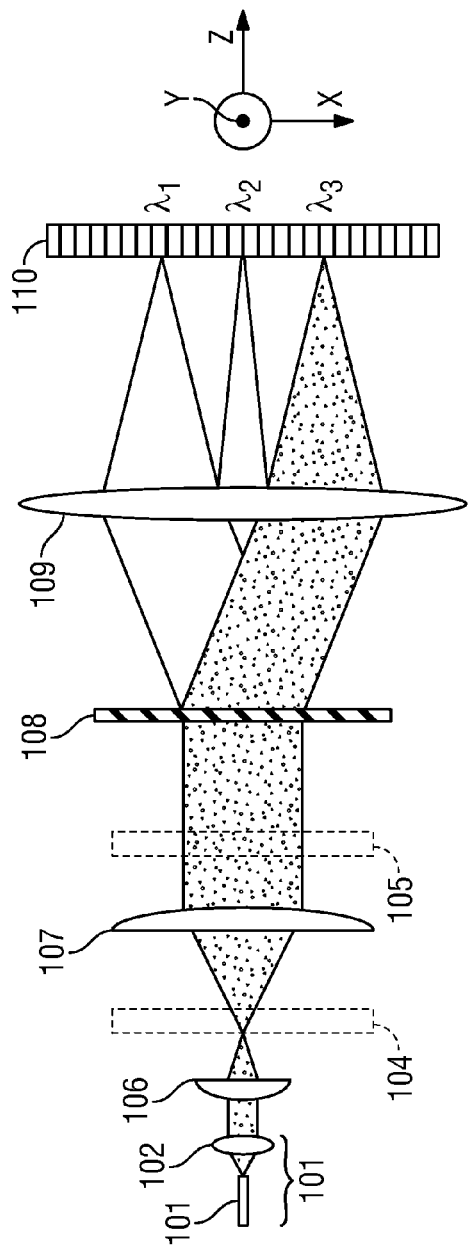
FIGS. 1A and 1B are top and side views respectively of one example of a simplified optical device such as a free-space wavelength selective switch (WSS) that may be used in conjunction with embodiments of the present invention.
Figure 1B:
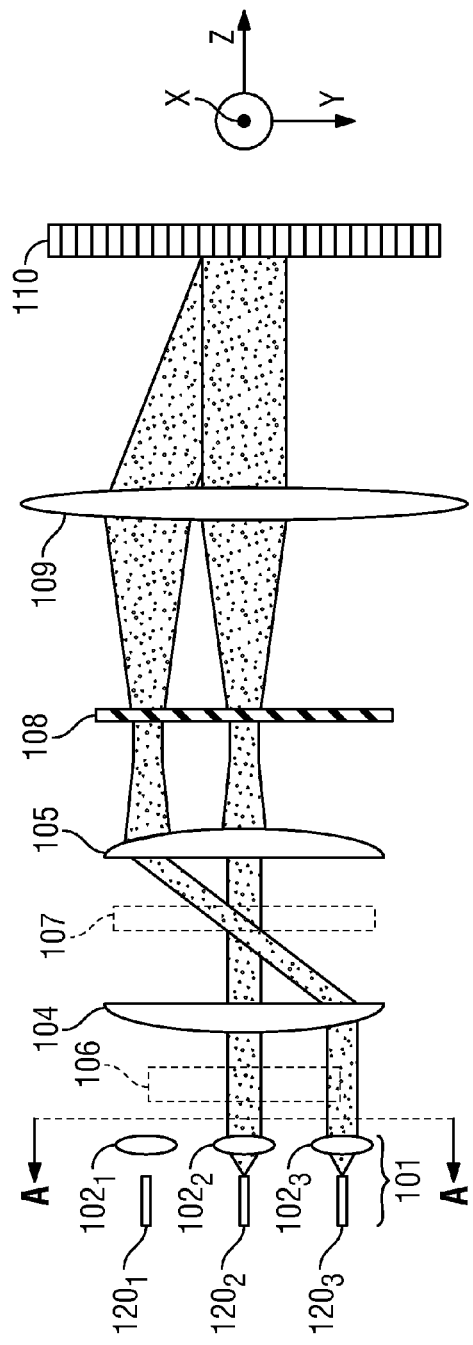

FIGS. 1A and 1B are top and side views respectively of one example of a simplified optical device such as a free-space WSS 100 that may be used in conjunction with embodiments of the present invention. Light is input and output to the WSS 100 through optical waveguides such as optical fibers which serve as input and output ports. As best seen in FIG. 1B, a fiber collimator array 101 may comprise a plurality of individual fibers $120_1$, $120_2$ and $120_3$ respectively coupled to collimators $102_1$, $102_2$ and $102_3$. Light from one or more of the fibers 120 is converted to a free-space beam by the collimators 102. The light exiting from port array 101 is parallel to the z-axis. While the port array 101 only shows three optical fiber/collimator pairs in FIG. 1B, more generally any suitable number of optical fiber/collimator pairs may be employed.

A pair of telescopes or optical beam expanders magnifies the free space light beams from the port array 101. A first telescope or beam expander is formed from optical elements 106 and 107 and a second telescope or beam expander is formed from optical elements 104 and 105.

In FIGS. 1A and 1B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 1A and 1B the optical elements 102, 108, 109 and 110 are depicted with solid lines in both figures. On the other hand, optical elements 106 and 107 are depicted with solid lines in FIG. 1A (since they have focusing power along the y-axis) and with dashed lines in FIG. 1B (since they leave the beams unaffected along the x-axis). Optical elements 104 and 105 are depicted with solid lines in FIG. 1B (since they have focusing power along the x-axis) and with dashed lines in FIG. 1A (since they leave the beams unaffected in the y-axis).

Each telescope may be created with different magnification factors for the x and y directions. For instance, the magnification of the telescope formed from optical elements 104 and 105, which magnifies the light in the x-direction, may be less than the magnification of the telescope formed from optical elements 106 and 107, which magnifies the light in the y-direction.

The pair of telescopes magnifies the light beams from the port array 101 and optically couples them to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The light from the dispersion element is directed to beam focusing optics 109.

Beam focusing optics 109 couple the wavelength components from the wavelength dispersion element 108 to a programmable optical phase modulator, which may be, for example, a liquid crystal-based phase modulator such as a LCoS device 110. The wavelength components are dispersed along the x-axis, which is referred to as the wavelength dispersion direction or axis. Accordingly, each wavelength component of a given wavelength is focused on an array of pixels extending in the y-direction. By way of example, and not by way of limitation, three such wavelength components having center wavelengths denoted $\lambda_1$, $\lambda_2$ and $\lambda_3$ are shown in FIG. 1A being focused on the LCoS device 110 along the wavelength dispersion axis (x-axis).

As best seen in FIG. 1B, after reflection from the LCoS device 110, each wavelength component can be coupled back through the beam focusing optics 109, wavelength dispersion element 108 and optical elements 106 and 107 to a selected fiber in the port array 101.

Figure 2:
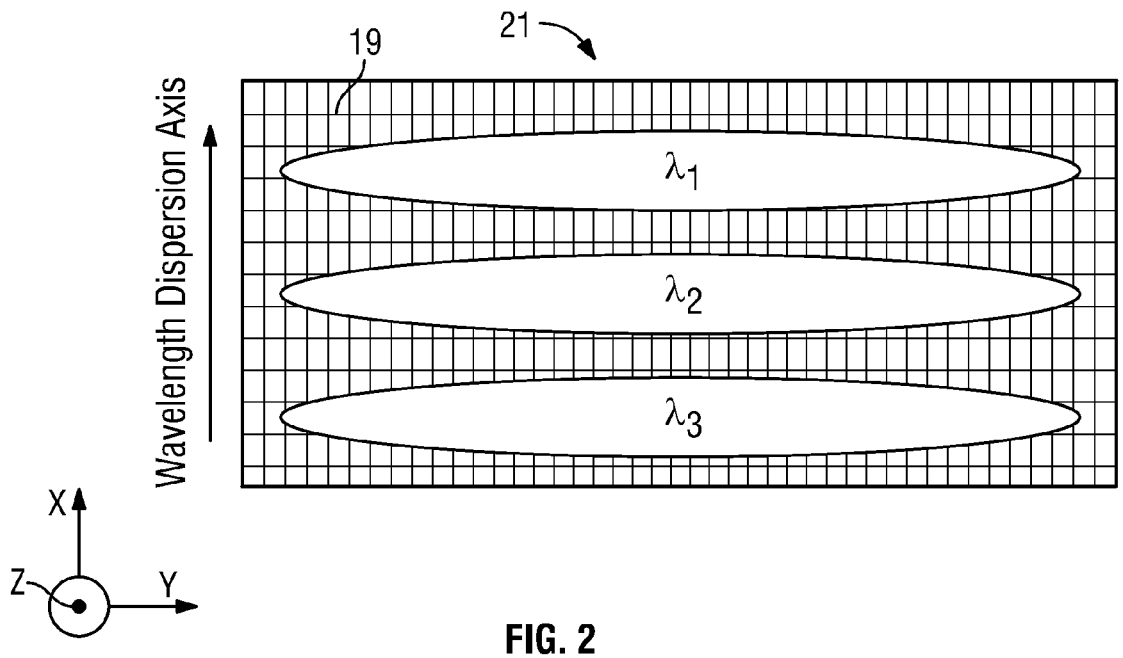
FIG. 2 is a front view of the LCoS device of FIG. 1 extending in the x-y plane.

FIG. 2 is a front view of the LCoS device 110 extending in the x-y plane.

The three wavelength components $\lambda_1$, $\lambda_2$ and $\lambda_3$ are spatially separated along the wavelength dispersion axis (x-axis). As will be discussed below, appropriate manipulation of the pixels 19 in the y-axis allows selective independent steering of each wavelength component to a selected output fiber.

A programmable optical phase modulator such as a LCoS device produces a phase shift at a given pixel location in a pixel array which is determined programmatically. Such a modulator can be used in multiple ways, forming virtual lenses, prisms or tilted mirrors among other items. Due to the limited thickness and actuation of a LCoS device, the total phase shift that can be achieved at any given location is limited. This limitation can be circumvented in a LCoS device by application of the segmentation technique similar to that used to form a Fresnel lens by compressing the surface power of a lens into a plano surface. Specifically, the total phase shift desired is usually modulo $2\pi$ at the wavelength of interest. The resultant phase is then always less than $2\pi$. Unfortunately, this segmentation technique introduces scattering of light in directions that an un-segmented pattern would not produce. This scattered light is a major reason the crosstalk is naturally higher in an LCoS WSS.

Figure 3:
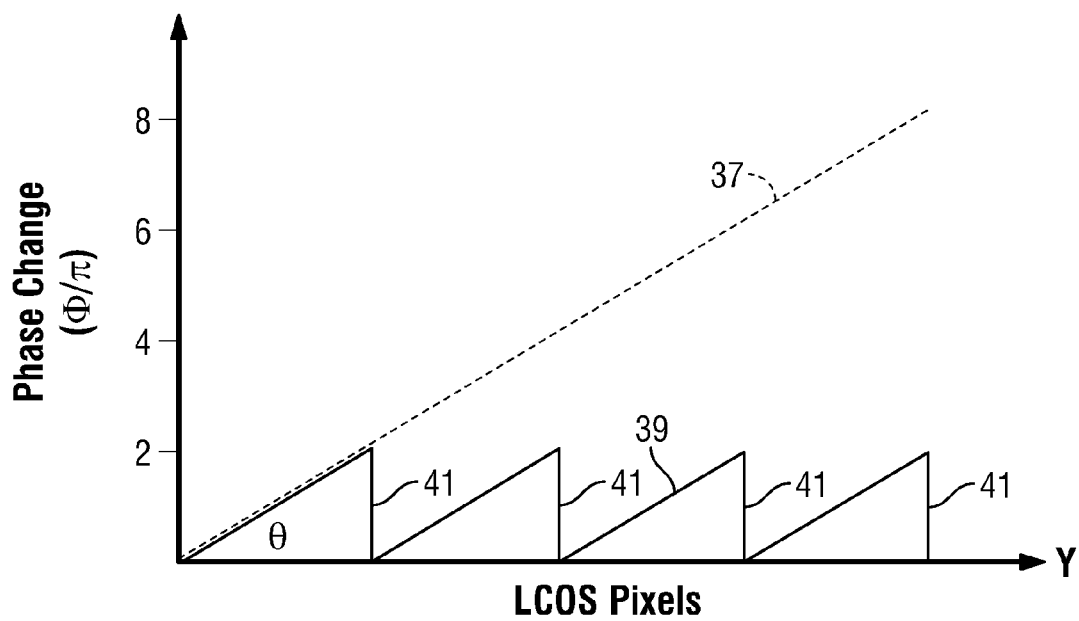
FIG. 3 shows an example of a periodic, stepped phase shift profile that may be produced across a region of a LCoS device in the y-axis.

Turning to FIG. 3, there is illustrated an example of a periodic, stepped phase shift profile 39 that may be produced across a region of a LCoS device 21 in the y-axis. The periodic, stepped phase shift profile 39 produces a cumulative phase profile 37. The cumulative steering profile 37 is produced by driving each pixel 19 with a predetermined voltage to provide a desired phase change. As there is a direct relationship between voltage and phase, and a direct relationship between phase and steering angle, a look-up table or the like can be generated which relates the required voltage drive signal with a desired steering angle. The periodic nature of phase is utilized to reduce the required drive voltage. Therefore a periodic, stepped voltage signal will produce the periodic, stepped phase shift profile 39, which in turn produces the cumulative phase profile 37, where phase resets 41 occur at multiples of $2\pi$ radians. When acting on an incident wavelength component, the phase profile 37 produces a steering angle proportional to or equal to θ. Accordingly, by proper adjustment of the periodic, stepped phase shift profile the wavelength components can be selectively directed to a desired one of the optical fibers.

Figure 4:
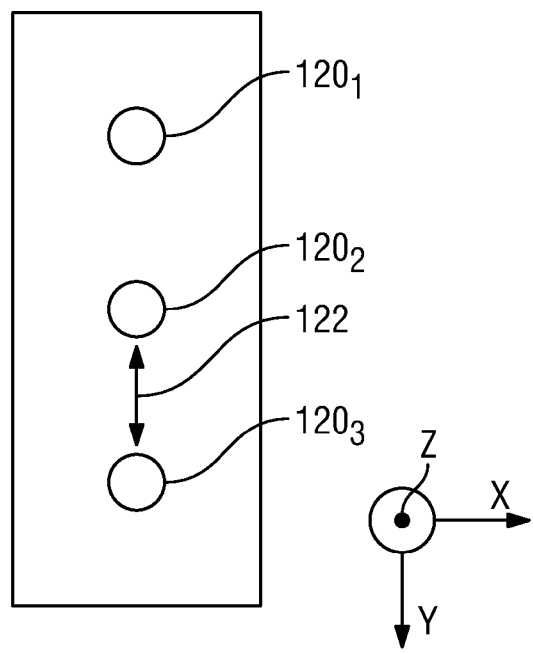
FIGS. 4 and 5 are front views taken along line A-A in FIG. 1B of the port array.

FIG. 4 is a front view taken along line A-A in FIG. 1B of port array 101. As shown the optical fibers 1201, 1202, 1203, ... extend in a 1×N configuration along the y-axis. When the LCoS device 110 steers a light beam from one optical fiber (serving as an input port to the WSS 100) to another optical fiber (serving as an output port to the WSS 100) such as from the optical fiber 1203 to the optical fiber 1202, for example, the beam is steered along a single direction (the y-axis), either in a positive or negative direction, as indicated by the arrows 122 in FIG. 4. In other words, the steering axis is coincident with the optical port axis along which the optical fibers 1201, 1202, 1203 ... are aligned. That is, the steering direction is not a function of the optical fiber or port to which the beam is being steered.

Figure 5:
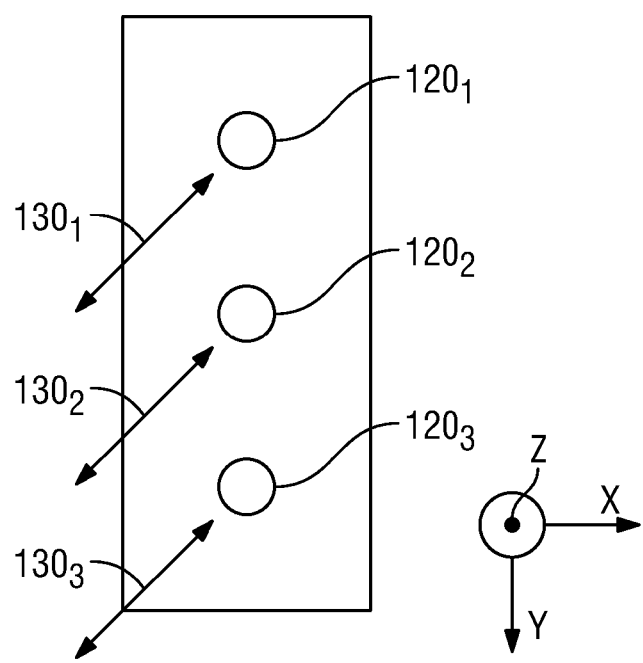

As previously mentioned, the scattered light that gives rise to crosstalk is preferentially aligned with the direction in which the beam is steered. That is, in FIG. 4 light is scattered along that axis indicated by arrows 122. As a result the scattered light is largely aligned with the ports, thereby causing the undesired crosstalk. This crosstalk can be reduced by rotating the beam steering axis (which is also the scattering axis along which light is scattered) so that it is no longer coincident with the optical port axis. Such an arrangement is shown in FIG. 5, in which the beam steering axis along which the light beam is steered to ports 1201, 1202, 1203 ... is represented by arrows 1301, 1302, 1303 ..., respectively. As a consequence, as the beam is steered to any particular port, scattered light will not also be scattered to that port.

Figure 6:
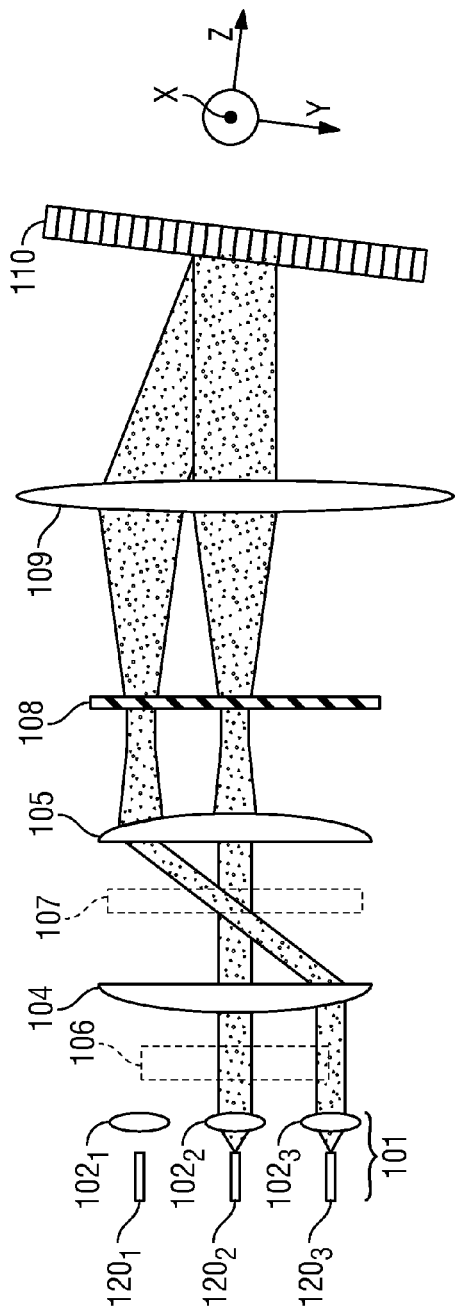
FIG. 6 is a side view of one example of a simplified optical device such as a free-space wavelength selective switch (WSS) in which crosstalk is reduced.

One way to accomplish this misalignment between the beam steering axis and the optical port axis is shown in FIG. 6, which is a side view of one example of a free-space WSS similar to the WSS shown in FIG. 1B. In FIGS. 1B and 6, like elements are denoted by like reference numerals. As shown, the plane in which the LCoS device 110 extends is no longer orthogonal to the axis along which the light propagates from the port array 101. That is, in the particular example of FIG. 6, the LOCS 110 is tilted about the x-axis so that it is no longer in the x-y plane and thus is no longer orthogonal to the z-axis along which the light propagates from the port array 101. Stated differently, a skewed angle is formed between the z-axis and a direction in the plane of the modulator perpendicular to the wavelength dispersion axis (i.e., the x-axis in FIG. 6).

Figure 7:
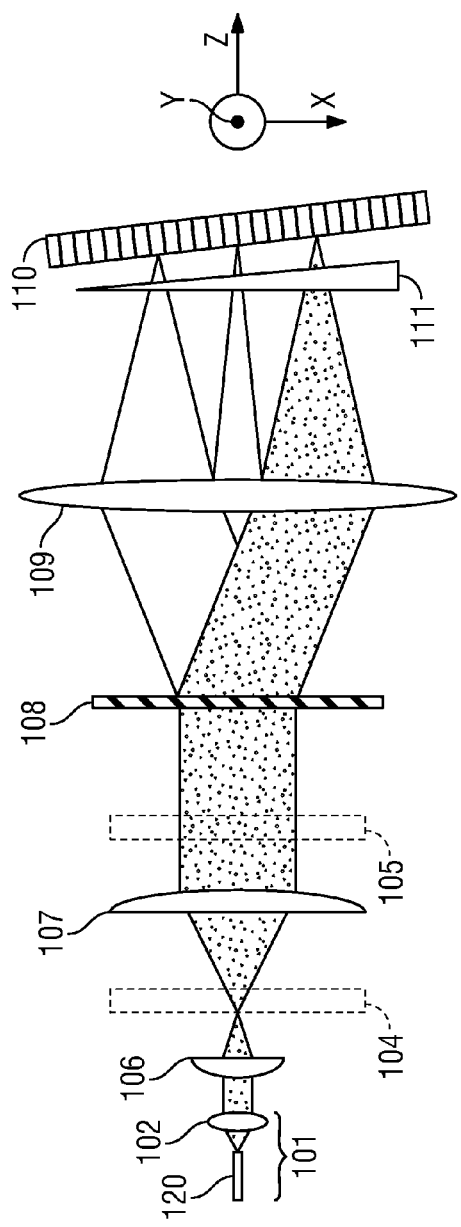
FIG. 7 shows an alternative embodiment of the optical device shown in FIG. 6.

Because of the skewed angle that is employed, the distance between the beam focusing optics 109 and the LCoS device 110 will be different along different portions of the LCoS device 110. In order to properly focus the light beam on any portion of the LCoS device 110 an optional focus correction element can be placed in the optical path of the system. For instance, as shown in FIG. 7, a focus correction element such as a low angle wedge prism 111 can be placed between the beam focusing optics 109 and the LCoS device 110.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:

1. An optical device, comprising:
    an optical port array having at least one optical input for receiving an optical beam and at least one optical output, the input and outputs extending along a common axis;
    a dispersion element receiving the optical beam from the at least one optical input and spatially separating the optical beam into a plurality of wavelength components;
    a focusing element for focusing the plurality of wavelength components; and
    a programmable optical phase modulator for receiving the focused plurality of wavelength components, the modulator being configured to steer the wavelength components to a selected one of the optical outputs, the programmable optical phase modulator being oriented with respect to the optical port array so that an axis along which the optical beam is steered is non-coincident with the common axis along which the input and outputs extend.

2. The optical device of claim 1 wherein a plane in which the programmable optical phase modulator extends forms a non-zero angle with a plane in which the common axis extends.

3. The optical device of claim 1 wherein the programmable optical phase modulator has a periodic, stepped phase shift profile.

4. The optical device of claim 1 wherein the programmable optical phase modulator includes a liquid crystal-based phase modulator.

5. The optical device of claim 4 wherein the liquid crystal-based phase modulator is a LCoS device.

6. The optical device of claim 1 wherein the dispersive element is selected from the group consisting of a diffraction grating and a prism.

7. The optical device of claim 1 further comprising an optical system for magnifying the optical beam received from the optical port array and directing the magnified optical beam to the dispersion element.

8. The optical device of claim 7 wherein the optical system has a first magnification factor in a first direction and a second magnification factor in a second direction orthogonal to the first direction, the first magnification factor being different from the second magnification factor.

9. The optical device of claim 8 wherein the first direction is parallel to a wavelength dispersion axis along which the optical beam is spatially separated, the first magnification factor being less than the second magnification factor.

10. A method for directing wavelength components of an optical beam from an input port of a port array to at least one output port of the port array, comprising:

receiving the optical beam at the input port;
spatially separating the wavelength components of the optical beam;
focusing the spatially separated wavelength components onto a programmable optical phase modulator so that the wavelength components are spatially separated along a wavelength dispersion axis of the modulator, the modulator receiving the wavelength components so that a skewed angle is formed between a first direction in which the wavelength components propagate after being collimated by the port array and a second direction in the plane of the modulator perpendicular to the wavelength dispersion axis; and
adjusting a phase shift profile of the modulator along the second direction to selectively direct individual ones of the wavelength components to an output port.

11. The method of claim 10 wherein the phase shift profile is a periodic, stepped phase shift profile.

12. The method of claim 10 wherein the programmable optical phase modulator includes a liquid crystal-based phase modulator.

13. The method of claim 12 wherein the liquid crystal-based phase modulator is a LCoS device.

14. The method of claim 10 further comprising magnifying the optical beam before spatially separating the wavelength components of the optical beam.

15. The method of claim 14 further comprising magnifying the optical beam in a first direction and a second direction orthogonal to the first direction.

16. The method of claim 15 wherein the first direction is parallel to the wavelength dispersion axis along which the optical beam is spatially separated, the magnification in the first direction being less than the magnification in the second direction.

* * * * *